(12) United States Patent
Rud et al.

(10) Patent No.: US 8,864,378 B2
(45) Date of Patent: Oct. 21, 2014

(54) PROCESS VARIABLE TRANSMITTER WITH THERMOCOUPLE POLARITY DETECTION

(75) Inventors: Jason H. Rud, Mayer, MN (US); Clarence Holmstadt, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 828 days.

(21) Appl. No.: 12/794,968

(22) Filed: Jun. 7, 2010

(65) Prior Publication Data
US 2011/0299567 A1    Dec. 8, 2011

(51) Int. Cl.
*G01K 7/02* (2006.01)

(52) U.S. Cl.
CPC ........................ *G01K 7/026* (2013.01)
USPC ................. 374/181; 374/179; 374/E7.004

(58) Field of Classification Search
CPC ................... G01K 7/026; G01K 7/02
USPC ........ 374/100, 163, 179, 181, E7.004, 1, 170, 374/183, 208
See application file for complete search history.

(56) References Cited

U.S. PATENT DOCUMENTS

| | | | | | |
|---|---|---|---|---|---|
| 2,400,384 | A | * | 5/1946 | Betz | 361/162 |
| 2,647,237 | A | | 7/1953 | Herbst | |
| 3,060,313 | A | * | 10/1962 | Ohmart et al. | 250/383 |
| 3,270,547 | A | * | 9/1966 | Macritchie et al. | 374/3 |
| 3,617,886 | A | | 11/1971 | Werme | 324/110 |
| 3,872,389 | A | | 3/1975 | Willard | |
| 3,992,229 | A | * | 11/1976 | Hall, Jr. | 136/227 |
| 4,060,461 | A | * | 11/1977 | Seyl | 324/425 |
| 4,120,201 | A | * | 10/1978 | Wargo | 374/181 |
| 4,122,719 | A | * | 10/1978 | Carlson et al. | 374/167 |
| 4,279,151 | A | | 7/1981 | Anderson | |
| 4,475,823 | A | | 10/1984 | Stone | |

(Continued)

FOREIGN PATENT DOCUMENTS

| | | |
|---|---|---|
| CN | 101553717 | 10/2009 |
| EP | 0917028 A1 | 5/1999 |

(Continued)

OTHER PUBLICATIONS

"STT 3000 Smart Temperature Transmitter, Model STT350 Operator Manual", Honeywell, EN1I-6162, Issue 8, Jul. 1999, 34 pages.

(Continued)

*Primary Examiner* — R. A. Smith
*Assistant Examiner* — Tania Courson
(74) *Attorney, Agent, or Firm* — Westman, Champlin & Koehler, P.A.

(57) ABSTRACT

A process variable transmitter for measuring a temperature of an industrial process, includes a first electrical connector configured to couple to a first wire of a thermocouple, the first electrical connector includes a first electrode and a second electrode. The first and second electrodes are configured to electrically couple to the first wire of the thermocouple. A second electrical connector is configured to couple to a second wire of the thermocouple, the second electrical connector includes a third electrode and a fourth electrode. The third and fourth electrodes are configured to electrically couple to the second wire of the thermocouple. The second wire is of a different material than the first wire. Measurement circuitry is coupled to the first and second electrical connectors configured to provide an output related to a temperature of the thermocouple. The measurement circuitry is further configured to identify polarity of thermocouple based upon at least one measurement taken between at least two of the first, second, third and fourth electrodes.

17 Claims, 4 Drawing Sheets

(56) References Cited

U.S. PATENT DOCUMENTS

| | | |
|---|---|---|
| 4,727,359 A | 2/1988 | Yuchi et al. |
| 4,783,659 A | 11/1988 | Frick |
| 4,841,286 A | 6/1989 | Kummer |
| 4,882,564 A | 11/1989 | Monroe et al. |
| 5,009,109 A * | 4/1991 | Kalotay et al. ........... 73/861.356 |
| 5,051,743 A | 9/1991 | Orszulak |
| 5,235,527 A | 8/1993 | Ogawa et al. |
| 5,294,890 A | 3/1994 | Hemminger et al. |
| 5,317,520 A | 5/1994 | Castle |
| 5,319,576 A | 6/1994 | Iannadrea |
| 5,350,237 A | 9/1994 | Hida |
| 5,498,079 A * | 3/1996 | Price ............................ 374/208 |
| 5,677,476 A | 10/1997 | McCarthy et al. |
| 5,700,090 A | 12/1997 | Eryurek |
| 5,703,575 A | 12/1997 | Kirkpatrick |
| 5,713,668 A * | 2/1998 | Lunghofer et al. ........... 374/179 |
| 5,829,876 A * | 11/1998 | Schwartz et al. ................. 374/1 |
| 6,397,114 B1 * | 5/2002 | Eryurek et al. ................ 700/51 |
| 6,434,504 B1 * | 8/2002 | Eryurek et al. .............. 702/130 |
| 6,449,574 B1 * | 9/2002 | Eryurek et al. ................ 702/99 |
| 6,473,710 B1 * | 10/2002 | Eryurek ........................ 702/133 |
| 6,519,546 B1 | 2/2003 | Eryurek et al. |
| 6,591,693 B1 * | 7/2003 | Mansfield et al. ....... 73/861.356 |
| 6,754,601 B1 * | 6/2004 | Eryurek et al. .............. 702/104 |
| 7,084,342 B2 * | 8/2006 | Schuh ............................ 136/230 |
| 7,367,712 B2 * | 5/2008 | Becker et al. ................. 374/185 |
| 7,658,539 B2 | 2/2010 | Engelstad |
| 7,712,958 B2 * | 5/2010 | Burmeister et al. .......... 374/183 |
| 7,917,204 B2 * | 3/2011 | Olson et al. .................. 600/547 |
| 8,112,565 B2 * | 2/2012 | Russell et al. .................. 710/62 |
| 8,311,778 B2 * | 11/2012 | Bronczyk et al. ............. 702/188 |
| 8,347,735 B2 * | 1/2013 | Loving .................... 73/861.356 |
| 8,378,872 B2 * | 2/2013 | Rud et al. ...................... 341/155 |
| 8,449,181 B2 * | 5/2013 | Rud et al. ...................... 374/185 |
| 2004/0255998 A1 | 12/2004 | Schuh |
| 2006/0161271 A1 | 7/2006 | Kirkpatrick et al. |
| 2008/0133710 A1 | 6/2008 | Suzuki et al. |
| 2012/0051399 A1 * | 3/2012 | Rud et al. ...................... 374/185 |

FOREIGN PATENT DOCUMENTS

| | | |
|---|---|---|
| EP | 1431768 A1 | 6/2004 |
| GB | 261116 | 11/1926 |
| JP | 06194234 A2 | 7/1994 |
| JP | 9-152379 | 6/1997 |
| JP | 2002-174555 | 6/2002 |
| JP | 2005233737 A | 9/2005 |
| WO | 2005062012 A1 | 7/2005 |

OTHER PUBLICATIONS

Notification of Transmittal of the International Search Report and the Written Opinion of the International Searching Authority, or the Declaration for PCT/US2011/038690 filed Jun. 1, 2011; mailing date Sep. 28, 2011, 12 pages.

Chinese Office Action from CN2011110097049X, dated May 30, 2013.

Canadian Office Action dated Jan. 27, 2014 in related application Serial No. 2,801,464. 3 pgs.

* cited by examiner

PROCESS VARIABLE TRANSMITTER WITH THERMOCOUPLE POLARITY DETECTION

BACKGROUND OF THE INVENTION

The present invention relates to process variable transmitters used in process control and monitoring systems. More specifically, the present invention relates to process variable transmitters which sense a temperature of a industrial process fluid using a thermocouple.

Process control transmitters are used to measure process parameters in a process control or monitoring system. Typically, the transmitter includes some type of a process variable sensor having an output which is digitized by an analog to digital converter and provided to an microprocessor. One type of process variable sensor is a temperature sensor which is used to sense a temperature of a process fluid. The sensed temperature can be used directly, or can be used to compensate another process variable such as flow. The process variable is transmitted from the remote location to a local location over a process control loop. The process control loop can comprise, for example, a two wire process control loop or other configuration, including a wireless configuration.

One type of temperature sensor is a thermocouple which is formed when two different types of metals are placed into contact. A voltage is produced between these two metals which is related to the temperature of the junction. This voltage can be measured and, if desired, digitized by circuitry in the transmitter. The thermocouple has two wires which are configured to connect to first and second electrical connectors of the transmitter. However, in order to obtain accurate temperature measurements, the orientation (i.e., polarity) of the thermocouple with respect to the first and second electrical connectors must be known.

SUMMARY OF THE INVENTION

A process variable transmitter for measuring a temperature of an industrial process, includes a first electrical connector configured to couple to a first wire of a thermocouple, the first electrical connector includes a first electrode and a second electrode. The first and second electrodes are made of different materials and are configured to electrically couple to the first wire of the thermocouple. A second electrical connector is configured to couple to a second wire of the thermocouple, the second electrical connector includes a third electrode and a fourth electrode. The third and fourth electrodes are made of different materials and are configured to electrically couple to the second wire of the thermocouple. The second wire is of a different material than the first wire. Measurement circuitry is coupled to the first and second electrical connectors configured to provide an output related to a temperature of the thermocouple. The measurement circuitry is further configured to identify polarity of thermocouple based upon at least one measurement taken between at least two of the first, second, third and fourth electrodes.

DETAILED DESCRIPTION OF ILLUSTRATIVE EMBODIMENTS

Figure 1:
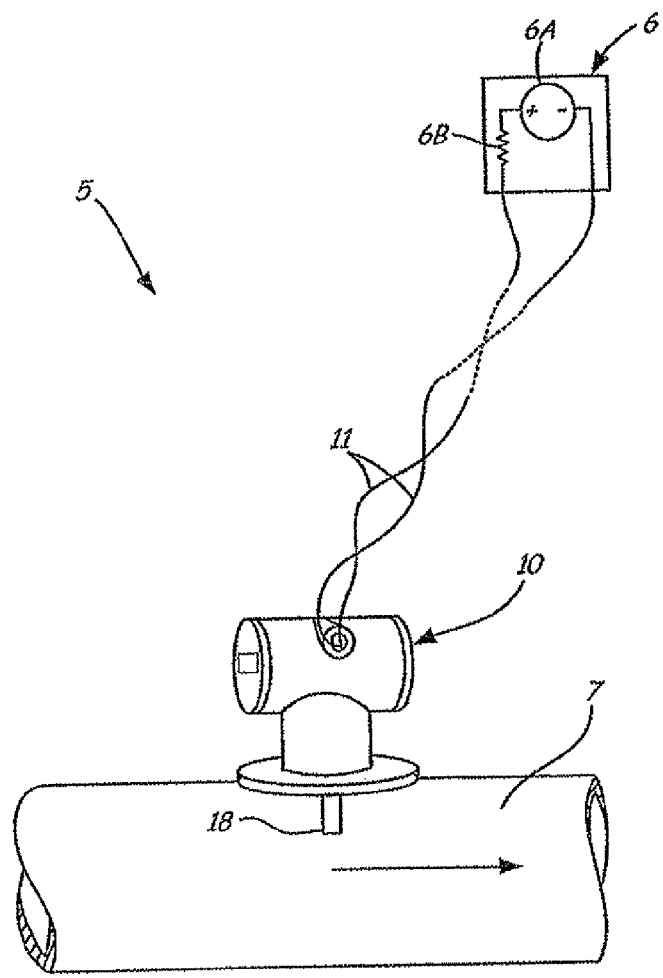
FIG. 1 is a simplified diagram showing an industrial process control system including a thermocouple temperature sensor configured to sense a temperature of a process fluid.

FIG. 1 is a simplified diagram of an industrial process control system 5. In FIG. 1, process piping 7 carries a process fluid. A process variable transmitter 10 is configured to couple to the process piping 7. Transmitter 10 includes a process variable sensor 18 which can comprise, for example, a thermocouple, transmitter 10 is configured to transmit information to a remote location such a process control room 6. The transmission can be over a process control loop, such as a two wire process control loop 11. The process control loop can be in accordance with any desired format including, for example, a 4-20 mA process control loop, a process control loop which carries digital communications, a wireless process control loop, etc. In the example shown in FIG. 1, the process control loop 11 is powered by a power supply 6A at control room 6. This power is used to provide power to the process variable transmitter 10. A sense resistor 6B can be used to sense the current flowing through loop 11.

Figure 2:
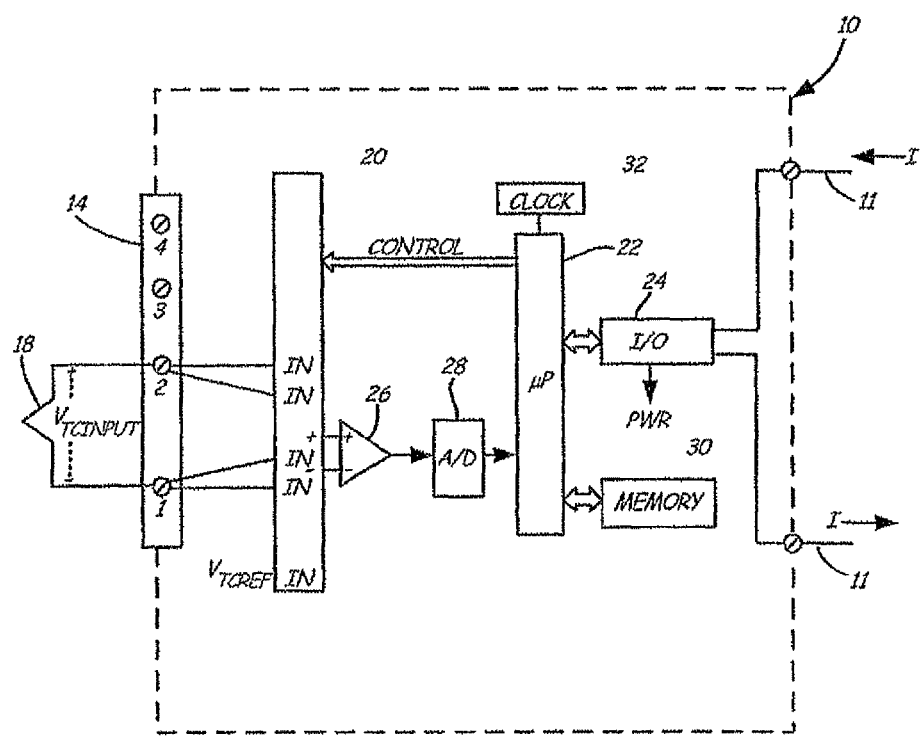
FIG. 2 is a simplified schematic diagram showing a temperature transmitter coupled to a thermocouple temperature sensor.

The present invention is directed to a process variable transmitter which is configured to identify an orientation (i.e., polarity) of a temperature sensor which is coupled to the device. FIG. 2 is a simplified block diagram of one embodiment of the invention in which process variable transmitter 10 is coupled to process control loop 11. Transmitter 10 includes a terminal block 14 configured to couple to a thermocouple 18. Terminal block 14 is illustrated as including four terminals, electrical connectors 1, 2, 3 and 4. For a thermocouple, only two electrical connectors are required. The process variable 10 includes a multiplexer 20 which is configured to provide data to an analog to digital converter which digitizes and provides data to the microprocessor 22 for processing and/or transmission over process control loop 11 using input/output circuitry 24. In this example, input/output circuitry 24 is also configured to provide power to the process variable transmitter 10 using power received over two wire process control loop 11. In wireless configuration, a battery may be used as the power source. The multiplexer 20 is controlled by microprocessor 22 to select between various inputs from terminal block 14. As discussed below in greater detail, there are two electrical connections between terminals 1 and 2 and multiplexer 20. A differential amplifier 26 is coupled to multiplexer 20 and configured to provide a voltage output to analog to digital converter 28. The voltage output is related to a voltage between any two of the inputs connected to multiplexer 20 as selected by microprocessor 22. Microprocessor 22 operates in accordance with instructions stored in memory 30 at a speed determined by clock 32. For example, the microprocessor 22 can use the voltage provided by analog to digital converter 28 to determine temperature related information from thermocouple 18.

During operation, the temperature of the thermocouple 18 creates a voltage $V_{TCINPUT}$ across terminals (electrical connectors) 1 and 2. A voltage reference $V_{TCREF}$ is also coupled to multiplexer 20. Transmitter 10 measures the temperature of thermocouple sensor 18 by determining the thermocouple voltage $V_{TC}$ with the following equation where:

$$V_{TC} = \frac{V_{TCINPUT}}{V_{TCREF}} (V_{TCREFNOM})  \qquad \text{EQ. 1}$$

As discussed below in greater detail, the electrical connector terminals 1 and 2 of terminal block 14 are configured to include two connections each for use in determining the orientation (polarity) of the thermocouple 18. Each connection 1,2 includes two electrodes made of dissimilar materials. The dissimilar materials are isolated from one another, until the wires from the thermocouple 18 are inserted into the connector. The wires from thermocouple 18 bridge the gap between the two dissimilar metals thereby creating a thermocouple at the process sensors cold junction at each connection point to the transmitter 10. The cold junction thermocouples will have different voltage characteristics based upon the sensor type and the two metals used for the connection. These voltages can be characterized over cold junction temperature functions to produce a polarity identification. This method will allow for changes in the process without affecting the indication of polarity.

Upon detection of a reverse polarity, the microprocessor can be configured to alert an operator or modify the temperature calculation equation to account for the reversed polarity.

Different types of thermocouples are identified by a wiring color designation. The four most common types of thermocouples are Type E, J, K and T. If the secondary materials of terminals 1 and 2 comprise Chromel® on a positive side and Constantan on a negative side, the configuration matches a Type E thermocouple. Chromel® is a registered trademark of Hoskins Manufacturing Company. Constantan which is a copper-nickel alloy usually consisting of 55% copper and 45% nickel. When a Type E thermocouple is coupled properly, the thermocouple cold junction voltage due to the two electrical connections between the thermocouple and the terminals 1 and 2, will produce a voltage of zero. On the other hand, if the connection is reversed, both of the cold junctions will produce a measurable voltage due to a small temperature gradient. Chromel® which is an alloy made of approximately 90 percent nickel and 10 percent chromium that is used to make the positive conductors of ANSI Type E (Chromel-constantan) and K (chromel-alumel) thermocouples. It can be used up to 1100° C. in oxidizing atmospheres.

Figure 3:
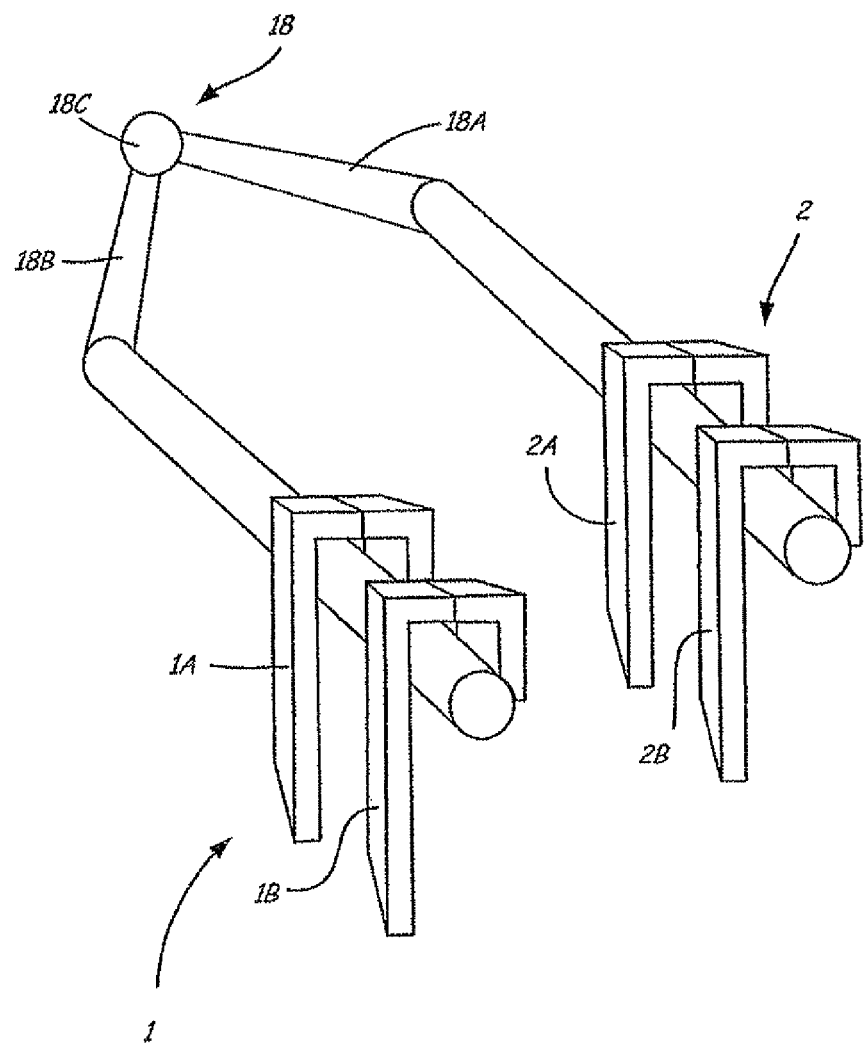
FIG. 3 is a perspective view showing an electrical connection between the thermocouple and the electrical connectors of the transmitter.

FIG. 3 is a perspective view showing thermocouple 18 connected to electrical connectors 1 and 2. The thermocouple 18 is formed by wires 18A and 18B, of two dissimilar metals, coming into contact at a junction 18C. Wire 18B couples to electrical connector 1. Electrical connector 1 is formed by a primary electrode 1A and a secondary electrode 1B. Similarly, wire 18A couples to electrical connector 2 which is formed by a primary electrode 2A and a secondary electrode 2B. Typically, electrodes 1A and 2A (the "primary" electrodes) can be made of standard metals such as nickel plated brass. The secondary electrodes 1B and 2B can be formed of a material suitable for use in a thermocouple such as Chromel® or Constantan. Other types of thermocouples, such as Type J and Type T also use Constantan as one of their wire materials while Type K uses Chromel®. When connected with proper polarity, the two cold junctions formed by electrodes 1B and 2B with wires 18B and 18A, respectively, will produce a voltage of zero. However, a small voltage will be present if the polarity is reversed. The polarity of other types of thermocouples can also be determined by characterizing the voltage formed at the secondary cold junctions across a range of temperature gradients. For example, one side will be more sensitive to small temperature gradients than the other side.

This also allows the system to check the configured sensor type against the cold junction effects of the attached sensor. If the sensor characteristics do not match the configured sensor, the configuration or installation may be incorrect.

Figure 4:
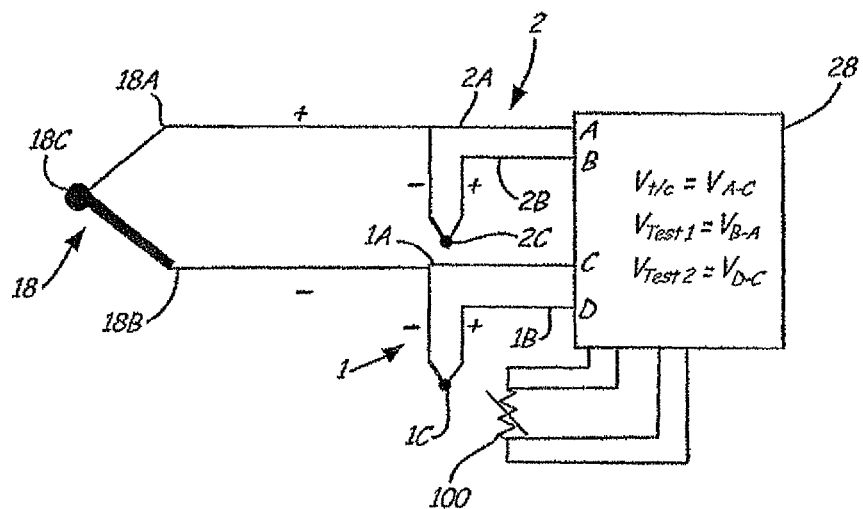
FIG. 4 is a schematic diagram showing the electrical connection to the thermocouple.

FIG. 4 is a simplified schematic diagram of thermocouple 18 coupled to analog to digital converter 28. In this example, multiplexer 20 and amplifier 26 are not shown for simplicity. The junctions formed between the secondary junctions 1B and 2B and wires 18B and 18A are illustrated as junctions 1C and 2C, respectively. FIG. 4 also illustrates a cold junction temperature sensor 100 which can comprise, for example, a RTD which has an electrical resistance which changes in response to temperature. Temperature sensor 100 is used to sense the temperature of terminal block 14 shown in FIG. 2 as a means to provide cold junction compensation for the typical thermocouple measurement.

Figure 5:
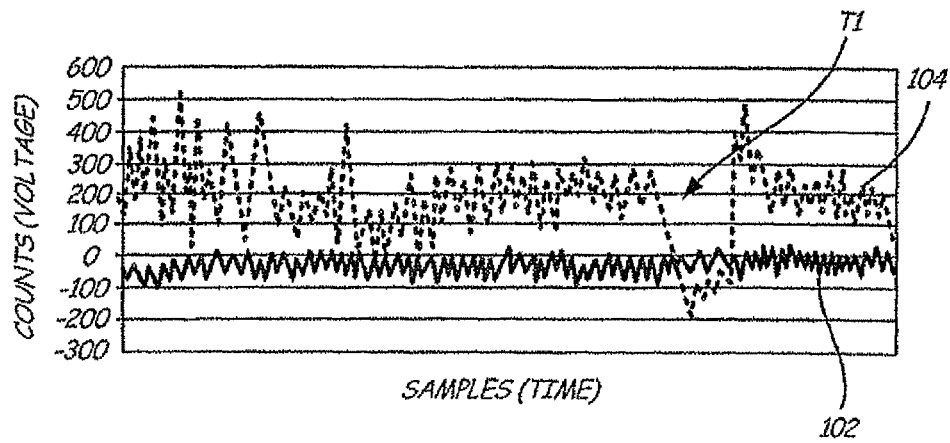
FIG. 5 is a graph of counts (voltage) versus samples (time) for a thermocouple connected to electrical connections of the present invention.

FIG. 5 is a graph of a "counts" versus "samples" which gives a representation of the voltage versus time for a Type E thermocouple. As discussed above, a Type E thermocouple comprises a junction formed by Chromel® and Constantan. In this example, the voltage between the thermocouple wires and the secondary electrodes are shown. The line illustrated at 102 is for the negative side of the thermocouple in which the secondary electrode comprises Chromel®. Similarly, line 104 illustrates the voltage at the junction between the other secondary electrode and the other wire of the thermocouple, i.e., a junction between Chromel® and Constantan. At time T1, a fan was directed at the cold junction. FIG. 5 shows that there is a voltage of approximately zero volts measured when the two materials are the same. However, when they are different, there is a measurable voltage with small fluctuations with temperature. In this example, the temperature change caused by application of the fan at time T1 is not needed to detect thermocouple polarity. Standard statistics such as standard deviation could be used to detect the polarity.

The above techniques can be used to detect the polarity of the thermocouple connected to the transmitter. An alert can be provided to an operator to indicate that the polarity is reversed or, in another example, software algorithms performed by microprocessor 22 can operate differently to address the reversed thermocouple. This technique can also be used to compensate for cold junction temperature gradients. As illustrated in FIG. 4, a temperature sensor 100 can be provided used to measure the cold junction temperature at the terminal block and used to adjust for errors produced in the voltage measurements. It is preferable to position this temperature sensor as close to the terminals 1, 2 as possible. However, in most cases, the cold junction temperature sensor must be placed some distance from the terminals thereby reducing the accuracy of the temperature measurements and therefore the cold junction temperature compensation. Further, resistive based temperature sensors typically have a slower response time to temperature changes in comparison to thermocouples. However, using the techniques of the present invention, the temperature change can be measured using the cold junction test connector and used to apply a correction to the measured cold junction temperature of thermocouple 18.

Although the present invention has been described with reference to preferred embodiments, workers skilled in the art will recognize that changes may be made in form and detail without departing from the spirit and scope of the invention. As illustrated, the electrodes can be spaced apart or otherwise electrically insulated from each other. Example thermocouple materials include: Type K chromel-alumel; Type J iron-constantan; Type T copper-constantan; Type E chromel-constantan.

What is claimed is:

1. A process variable transmitter for measuring a temperature of an industrial process, comprising:
   a first electrical connector configured to couple to a first wire of a thermocouple, the first electrical connector comprising a first electrode and a second electrode, the first and second electrodes configured to electrically couple to the first wire of the thermocouple;
   a second electrical connector configured to couple to a second wire of the thermocouple, the second electrical connector comprising a third electrode and a fourth electrode, the third and fourth electrodes configured to electrically couple to the second wire of the thermocouple, the second wire of a different material than the first wire; and
   measurement circuitry coupled to the first and second connectors configured to provide an output related to a temperature of the thermocouple, the measurement circuitry further configured to identify polarity of thermocouple based upon at least one voltage measurement taken between at least one of the first and second electrodes or the third and fourth electrodes and as a function of the first and second wires of the thermocouple being of different materials, wherein the first and second electrodes comprise different materials and the at least one voltage measurement has a value which is different when the thermocouple is connected with a correct polarity than when the thermocouple is connected with a reversed polarity.

2. The process variable transmitter of claim 1 wherein the measurement circuitry is configured to identify a type of the thermocouple based upon the at least one voltage measurement.

3. The process variable transmitter of claim 2 wherein the measurement circuitry is configured to provide an output if the identified type of the thermocouple is different than a configuration stored in the measurement circuitry.

4. The process variable transmitter of claim 1 wherein the third and fourth electrodes comprise different materials.

5. The process variable transmitter of claim 4 wherein the second and fourth electrodes comprise the same material.

6. The process variable transmitter of claim 1 wherein the second and fourth electrodes comprise a thermocouple material.

7. The process variable transmitter of claim 1 wherein the measurement circuitry is configured to provide an output to an operator based upon an identification of reverse polarity of the thermocouple.

8. The process variable transmitter of claim 1 wherein the output from the measurement circuitry is provided on a process control loop.

9. The process variable transmitter of claim 1 including a temperature sensor proximate the first connector and wherein the measurement circuitry compensates a temperature measurement based upon a voltage measured across the first and second electrodes and an output from the temperature sensor.

10. The process variable transmitter of claim 1 including a multiplexer configured to selectively couple pairs of electrical connections from the first, second, third and fourth electrodes to an analog to digital converter.

11. A method in a process variable transmitter for identifying a polarity of a thermocouple coupled to a process variable transmitter of an industrial process, comprising:
    connecting a first electrical connector to a first wire of a thermocouple, the first electrical connector comprising a first electrode and a second electrode;
    connecting a second electrical connector to a second wire of the thermocouple, the second electrical connector comprising a third electrode and fourth electrode, the second wire of a material which is different than the first wire;
    identifying a polarity of the thermocouple based upon the voltage measured between at least one of the first and second electrodes or the third and fourth electrodes and as a function of the first and second wires of the thermocouple being of different materials; wherein the first and second electrodes comprise different materials and the at least one voltage measurement has a value which is different when the thermocouple is connected with a correct polarity than when the thermocouple is connected with a reversed polarity.

12. The method of claim 11 wherein the third and fourth electrodes comprise different materials.

13. The method of claim 12 wherein the second and fourth electrodes comprise the same material.

14. The method of claim 11 wherein the second and fourth electrodes comprise a thermocouple material.

15. The method of claim 11 including alerting an operator in response to identifying a reverse polarity of the thermocouple.

16. The method of claim 11 including outputting on a process control loop.

17. The method of claim 11 including compensating a temperature measured based upon a voltage across the first and second electrodes measuring a temperature proximate the first connector and the measured temperature.

* * * * *